United States Patent
Prediger et al.

(10) Patent No.: US 12,442,910 B2
(45) Date of Patent: Oct. 14, 2025

(54) METHODS AND SYSTEMS FOR RADAR DATA PROCESSING

(71) Applicant: Aptiv Technologies AG, Schaffhausen (CH)

(72) Inventors: Christian Prediger, Lindlar (DE); Mirko Meuter, Erkrath (DE)

(73) Assignee: APTIV TECHNOLOGIES AG, Schaffhausen (CH)

( * ) Notice: Subject to any disclaimer, the term of this patent is extended or adjusted under 35 U.S.C. 154(b) by 342 days.

(21) Appl. No.: 17/810,122

(22) Filed: Jun. 30, 2022

(65) Prior Publication Data

US 2023/0003869 A1   Jan. 5, 2023

(30) Foreign Application Priority Data

Jun. 30, 2021 (EP) .................................... 21182868
Jun. 30, 2021 (EP) .................................... 21182874
Jun. 15, 2022 (EP) .................................... 22179201

(51) Int. Cl.
    *G01S 13/42*     (2006.01)
    *G01S 13/931*     (2020.01)

(52) U.S. Cl.
    CPC ............ *G01S 13/42* (2013.01); *G01S 13/931* (2013.01); *G01S 2013/932* (2020.01)

(58) Field of Classification Search
None
See application file for complete search history.

(56) References Cited

U.S. PATENT DOCUMENTS

| | | | |
|---|---|---|---|
| 8,798,927 B2 | 8/2014 | Rasshofer et al. | |
| 2006/0176160 A1 | 8/2006 | Zoratti et al. | |
| 2010/0165323 A1 | 7/2010 | Fiess et al. | |
| 2018/0137760 A1* | 5/2018 | Kobayashi | G08G 1/16 |

FOREIGN PATENT DOCUMENTS

| | | |
|---|---|---|
| DE | 10349210 | 2/2014 |
| EP | 2084554 | 8/2009 |
| EP | 3296762 | 3/2018 |
| GB | 2422499 | 7/2006 |

OTHER PUBLICATIONS

"Foreign Office Action", EP Application No. 22179201.3, Aug. 2, 2023, 5 pages.
"Extended European Search Report", EP Application No. 22179201.3, Oct. 17, 2022, 7 pages.
First Office Action regarding Chinese Patent Application No. 202210718402.X, dated Jul. 16, 2025. Translation provided by Google Translate.

* cited by examiner

*Primary Examiner* — Whitney Moore
(74) *Attorney, Agent, or Firm* — Harness, Dickey & Pierce, P.L.C.

(57) ABSTRACT

A computer implemented method for radar data processing includes the following steps carried out by computer hardware components: acquiring radar data from a radar sensor mounted on a vehicle; determining at least one of a speed of the vehicle or a steering wheel angle of the vehicle; and determining a subset of the radar data for processing based on the at least one of the speed of the vehicle or the steering wheel angle of the vehicle.

15 Claims, 8 Drawing Sheets

METHODS AND SYSTEMS FOR RADAR DATA PROCESSING

INCORPORATION BY REFERENCE

This application claims priority to European Patent Application Number EP22179201.3, filed on Jun. 15, 2022, which in turn claims priority to European Patent Application Number EP21182868.6, filed on Jun. 30, 2021, and to European Patent Application Number EP21182874.4, filed on Jun. 30, 2021, the disclosures of which are incorporated by reference in their entireties.

BACKGROUND

Processing radar data is an essential task for various applications, for example for (at least partially) autonomously driving vehicles. However, processing radar data is computationally expensive.

Accordingly, there is a need to provide methods and systems for efficient processing of radar data.

SUMMARY

The present disclosure relates to methods and systems for radar data processing, in particular adaptive radar sight.

The present disclosure provides a computer implemented method, a computer system and a non-transitory computer readable medium according to the independent claims. Example implementations are given in the subclaims, the description and the drawings.

In some example implementations, the present disclosure is directed to a computer implemented method for radar data processing, with the method comprising the following steps performed (in other words: carried out) by computer hardware components: acquiring radar data from a radar sensor mounted on a vehicle; determining at least one of a speed of the vehicle or a steering wheel angle of the vehicle; and determining a subset of the radar data for processing based on the at least one of the speed of the vehicle or the steering wheel angle of the vehicle.

According to an implementation, the radar data comprises data with a range dimension and an angle dimension; and the subset comprises a subset along the range dimension and/or along the angle dimension.

According to an implementation, the range dimension comprises a range up to 60 m, or up to 100 m, or up to 135 m, or up to 150 m, or up to 200 m, or up to 210 m, or up to 300 m; and/or the angle dimension comprises an angle range of 30°, or 35°, or 45°, or 60°, or 75°, or 90°.

According to an implementation, the subset comprises a subset along the range dimension based on the speed of the vehicle.

According to an implementation, for a speed below a first speed threshold, the range dimension is limited to a first range limit.

According to an implementation, the subset comprises a subset along the angle dimension based on the speed of the vehicle.

According to an implementation, for a speed below between the first speed threshold and a second speed threshold, the range dimension is limited to a second range limit and the angle dimension is limited between a first angle limit and a second angle limit.

According to an implementation, for a speed higher than the second speed threshold, the angle dimension is limited between a third angle limit and a fourth angle limit.

For example, ranges and speeds may be in the following range:
1) 50 m range for a speed between 0 and 20 km/h (with a 10 km/h hysteresis);
2) 105 m range for a speed between 20 km/h and 70 km/h (with a 10 km/h hysteresis); and
3) 200 m range for a speed above 70 km/h (with a 10 km/h hysteresis) (for example corresponding to a highway/rural top speed in Germany), including a hysteresis overlap.

According to an implementation, the subset comprises a subset along the angle dimension based on the steering wheel angle of the vehicle.

According to an implementation, the subset along the range dimension is determined based on filtering out input beam vectors for angle finding.

According to an implementation, the subset along the angle dimension is determined based on limiting an output of an angle finding method.

According to an implementation, the speed of the vehicle and/or the steering wheel angle of the vehicle is determined from a bus system of the vehicle.

In other example implementations, the present disclosure is directed at a computer system, with said computer system comprising a plurality of computer hardware components configured to carry out several or all operations of the computer implemented method described herein.

The computer system may comprise a plurality of computer hardware components (for example a processor, for example processing unit or processing network, at least one memory, for example memory unit or memory network, and at least one non-transitory data storage). It will be understood that further computer hardware components may be provided and used for carrying out operations of the computer implemented method in the computer system. The non-transitory data storage and/or the memory unit may comprise a computer program for instructing the computer to perform several or all operations or aspects of the computer implemented method described herein, for example using the processing unit and the at least one memory unit.

In still other example implementations, the present disclosure is directed at a vehicle comprising the computer system as described herein and the radar sensor.

In yet still other example implementations, the present disclosure is directed at a non-transitory computer readable medium comprising instructions for carrying out several or all operations or aspects of the computer implemented method described herein. The computer readable medium may be configured as: an optical medium, such as a compact disc (CD) or a digital versatile disk (DVD); a magnetic medium, such as a hard disk drive (HDD); a solid state drive (SSD); a read only memory (ROM), such as a flash memory; or the like. Furthermore, the computer readable medium may be configured as a data storage that is accessible via a data connection, such as an internet connection. The computer readable medium may, for example, be an online data repository or a cloud storage.

The present disclosure is also directed at a computer program for instructing a computer to perform several or all operations or aspects of the computer implemented method described herein.

With the methods and systems as described herein, adapting the processing of signals within selected range/field-of-view of a vehicle radar system based on operative parameters of the vehicle and/or driving environment may be provided. Thus, the hardware requirements of the ML (machine learning) radar recognition may be decreased.

BRIEF DESCRIPTION OF THE DRAWINGS

Example implementations and functions of the present disclosure are described herein in conjunction with the following drawings, showing schematically.

DETAILED DESCRIPTION

In various embedded systems, method for machine learning (ML) are used to solve perception tasks. The product which is performing these tasks may be deep neural networks (DNN).

The ML technology may be superior in many fields, but it may lead to large computational requirements. As a large part of the technology was developed for server and web applications, embedded resource requirements are not always an initial requirement. Strategies for embedded deployment of DNNs are optimization techniques and special purpose hardware. Even though those technologies are a precondition to computing those methods, it may still be important to reduce the resource as it creates large systems cost.

According to various aspects, in order to limit the computational requirements, the input data may be delimited, such that only relevant data is chosen. Regarding perception, this may mean to reduce the spatial area to one in which detected objects or obstacles are relevant for the vehicle.

According to various aspects, by creation of a region of interest (ROI), the data according to areas which are irrelevant may be excluded from expensive computation.

In case of a radar sensor, this may be non-trivial, since a spatial position of an input data is not defined. Furthermore, radars are already designed to fit to the expected requirements. According to various aspects, certain driving parameters may be taken into account for effectively solving this problem.

In commonly used methods, the input data which is used is not limited by an effective input data reduction. Thereby, the computational complexity stays high and thereby the expected product cost stay high as well.

In the following, creating an adaptive region of interest for front radar sensors according to various aspects will be described.

Front radar sensors may be designed to reach a long range and in the same time create an aperture angle which enables overlooking driving situations in the front near to the car.

Figure 1A:
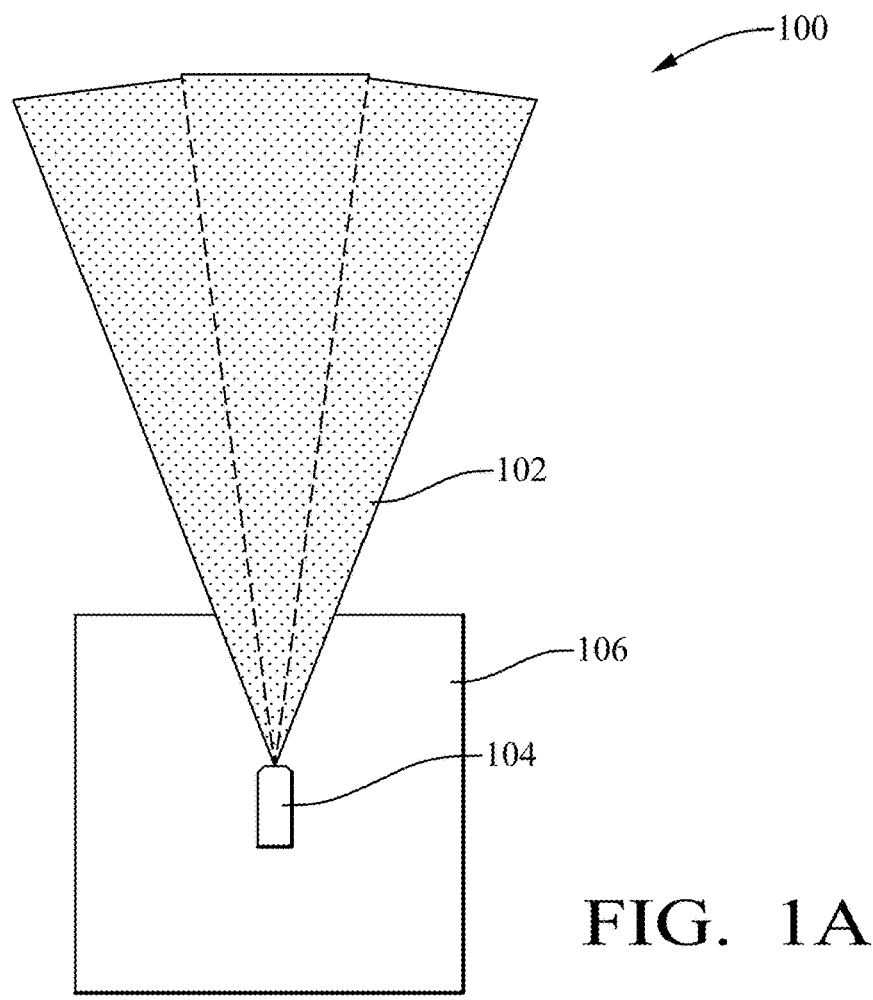
FIG. 1A is an illustration of an example full radar range.
Figure 1B:
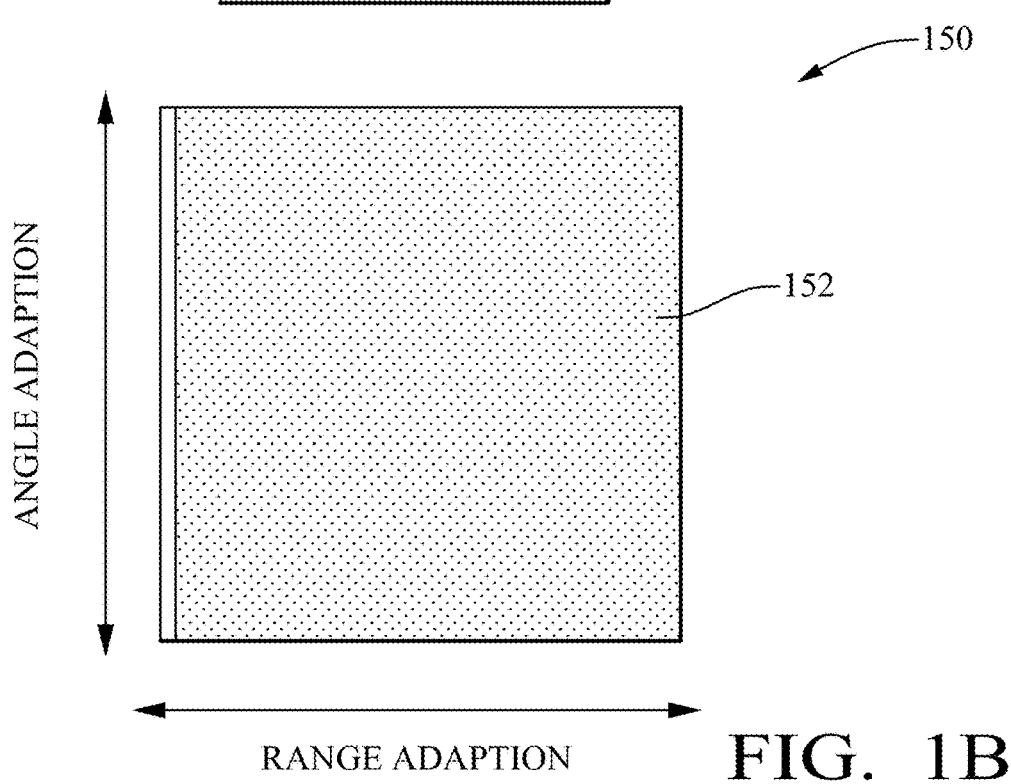
FIG. 1B depicts examples of a full range and full angle area.

FIG. 1A shows an illustration 100 of a full radar range. The ego vehicle 104 is illustrated as a black rectangle surrounded by a near range field of view 106, which may be used for 360 degree surround recognition. The field of view 102 is illustrated in an example of a front radar sensor. As the full area is covered, the ML radar recognition method may have to be applied on the full range and angle area 152 (as illustrated in illustration 150 of FIG. 1B), creating high computational requirements.

According to various aspects, an adaptive region of interest may be provided using at least one of the following:
1) Adapting the range region of interest dependent on ego vehicle speed; and/or
2) Adapting the angular region of interest dependent on the steering wheel angle.

Both values (the ego vehicle speed and the steering wheel angle) may be available in the vehicles (for example cars or trucks) and may be obtained from a bus system (for example CAN, LIN, or Ethernet) that is available.

Further possibilities to limit the input data may be applied additionally or not, dependent on the full system requirements. Two examples of such further methods are:
Inner region of interest for near range traffic recognition; and/or
Static object filtering dependent on ego speed and thereby filtering for static doppler speed (which may provide a "tailored datacube").

Both further methods do not solve the case of a front radar intended to recognize moving objects.

According to various aspects, the range region of interest may be adapted dependent on ego vehicle speed, as illustrated in FIG. 2A to FIG. 4B.

Figure 2A:
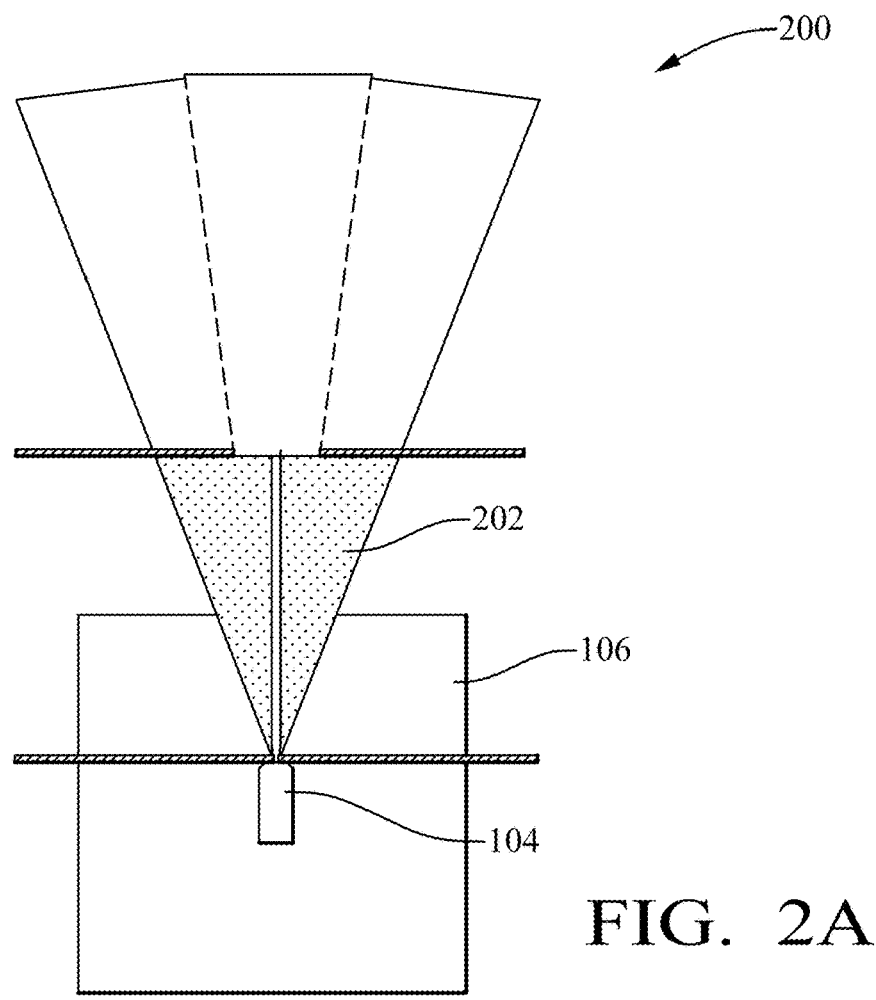
FIGS. 2A and 2B are illustrations of an example low-speed situation according to various implementations.
Figure 2B:
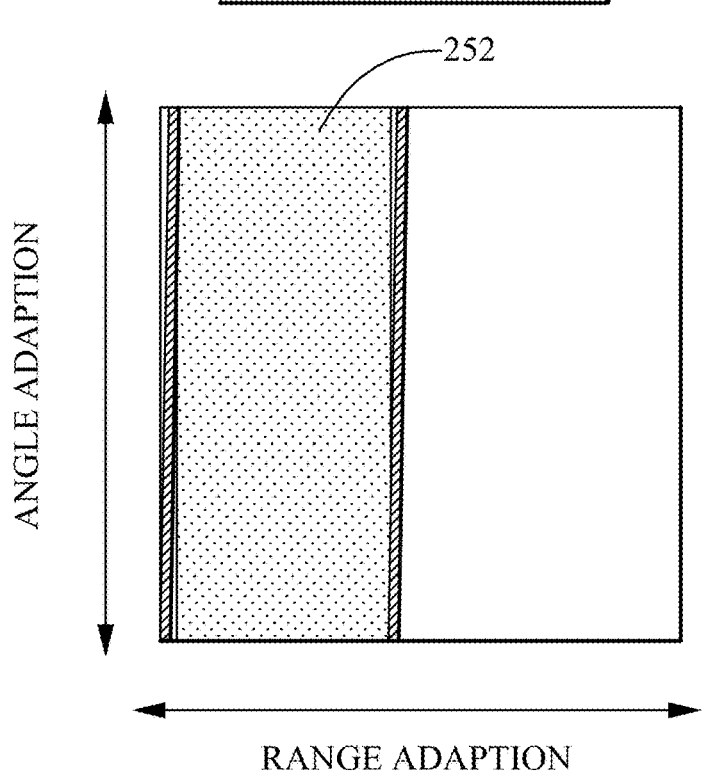

FIG. 2A and FIG. 2B show illustrations 200 and 250 of a low-speed situation according to various implementations.

In low-speed situations, it may be sufficient to limit the range of the front radar sensor to a certain range 202, as objects in that area would have impact on the driving decisions, and objects further away may not yet be relevant. By this limitation, the range dimension of the input data can be reduced to area 252, and the angle field of view may be kept wide.

Figure 3A:
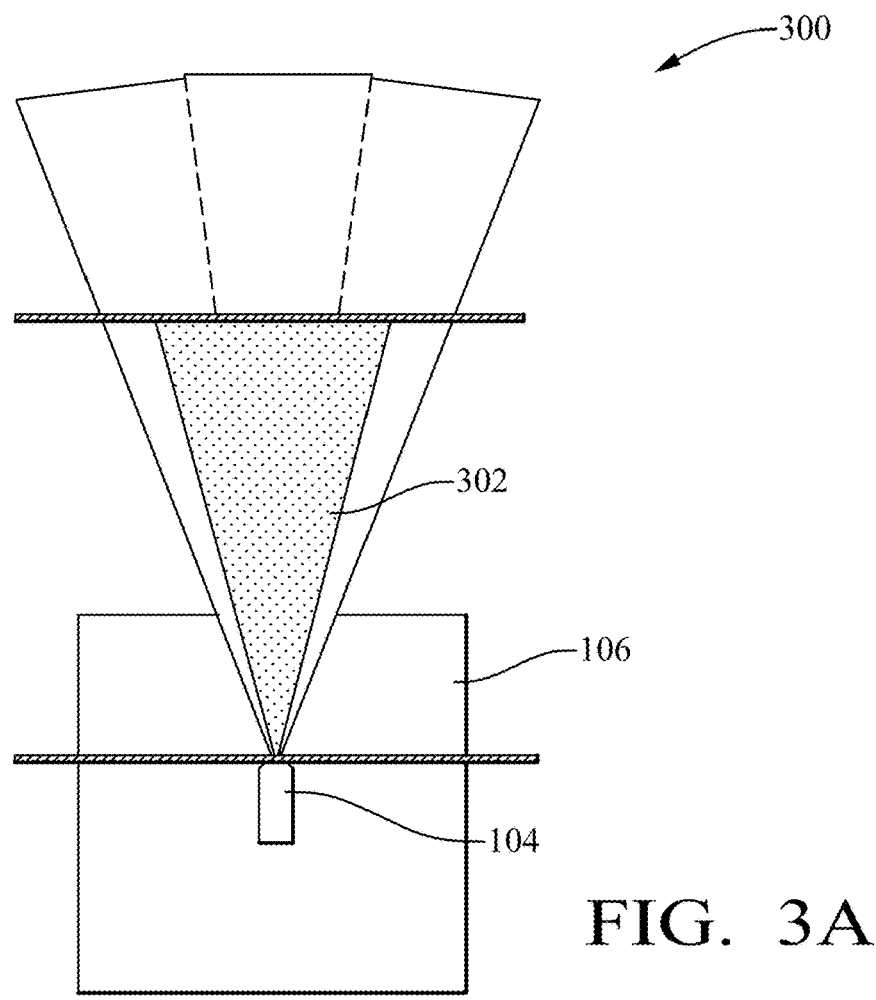
FIGS. 3A and 3B are illustrations of an example mid-speed situation according to various implementations.
Figure 3B:
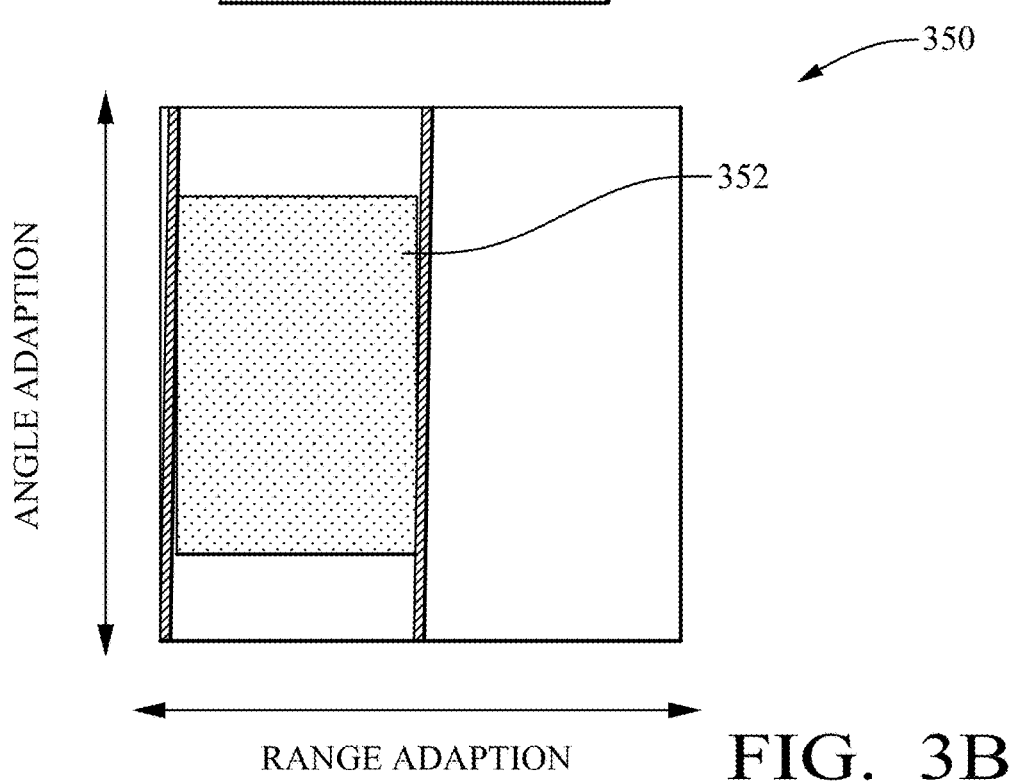

FIG. 3A and FIG. 3B show illustrations 300 and 350 of a mid-speed situation according to various implementations.

In mid-speed situations, the area 302 needed from range dimension side may get bigger. But a limitation of the angular area may limit the input data effectively, leaving out the sides of the angular field in which the vehicle will not enter. The resulting area 352 is illustrated in the range vs. angle diagram of FIG. 3B.

Figure 4A:
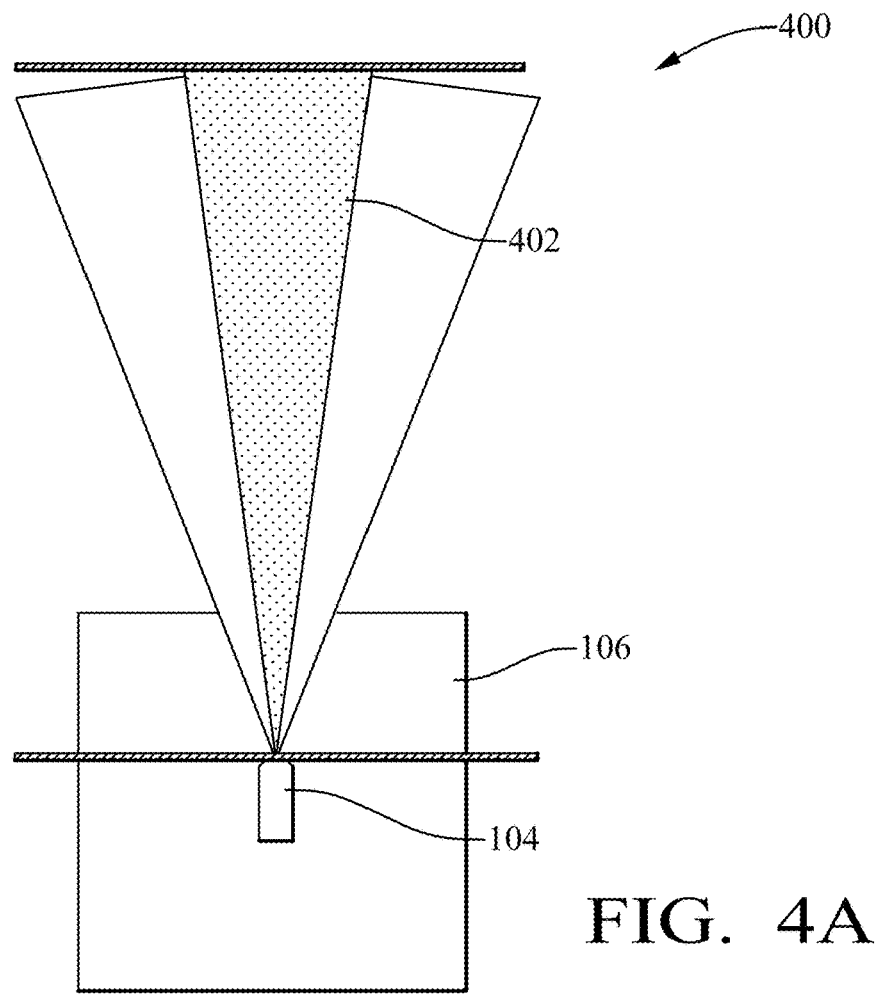
FIGS. 4A and 4B are illustrations of an example high-speed situation according to various implementations.
Figure 4B:
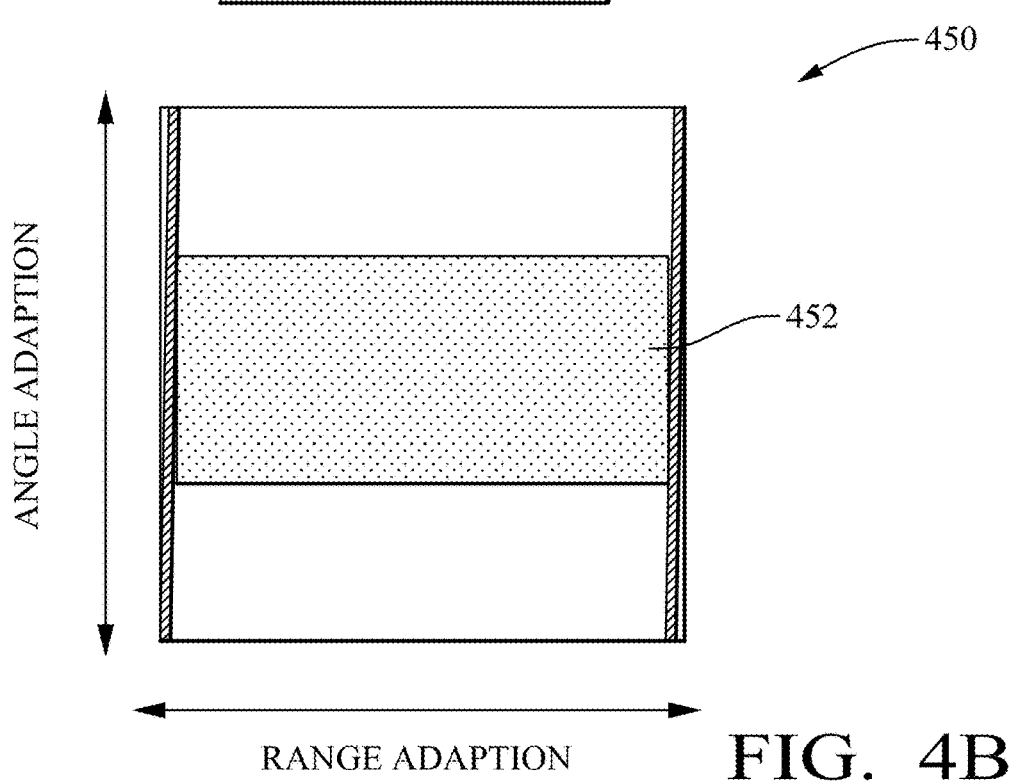

FIG. 4A and FIG. 4B show illustrations 400 and 450 of a high-speed situation according to various implementations.

In high-speed situations, it may be important to look far forward into the driving direction, as far as possible. In favor of this large range, the angular opening angle 402 may further be reduced. The resulting area 452 is illustrated in the range vs. angle diagram of FIG. 4B.

In order to maximize the reduction of angular opening angle without missing relevant objects, the angular region of interest may be adapted dependent on the steering wheel angle, like will be described with reference to FIG. 5A and FIG. 5B.

Figure 5A:
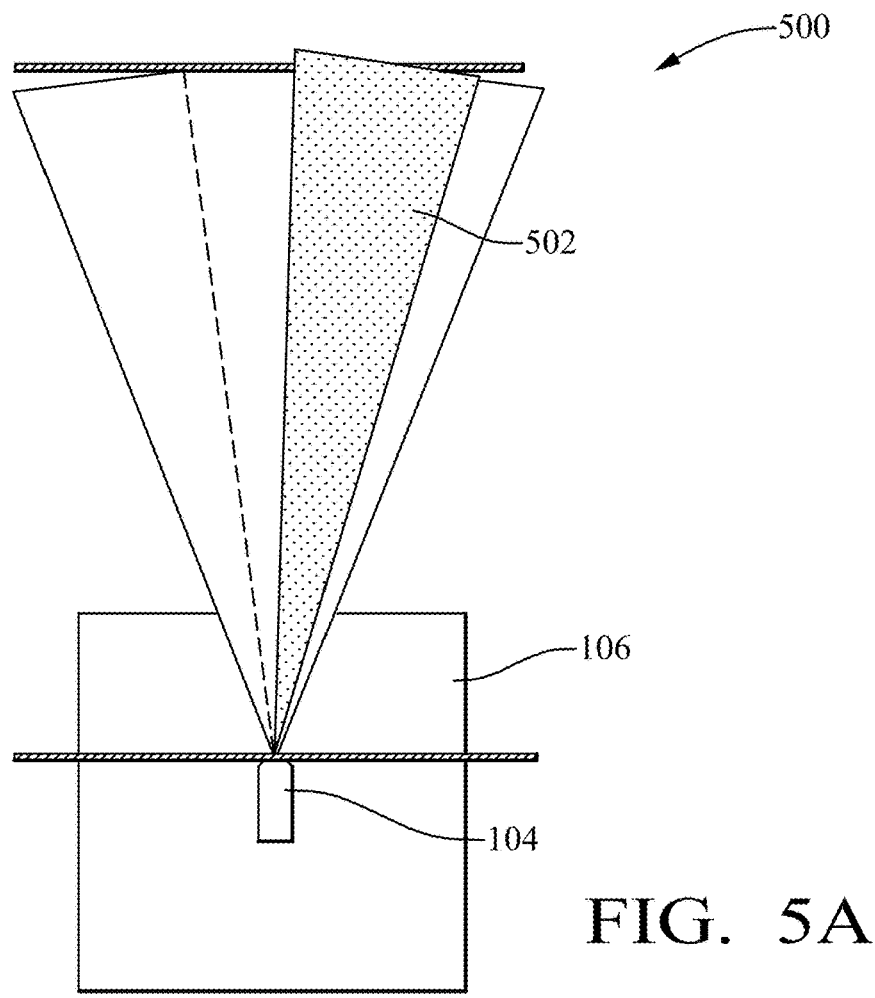
FIGS. 5A and 5B are illustrations of an example adaption of the angular region of interest dependent on the steering wheel angle according to various implementations.
Figure 5B:
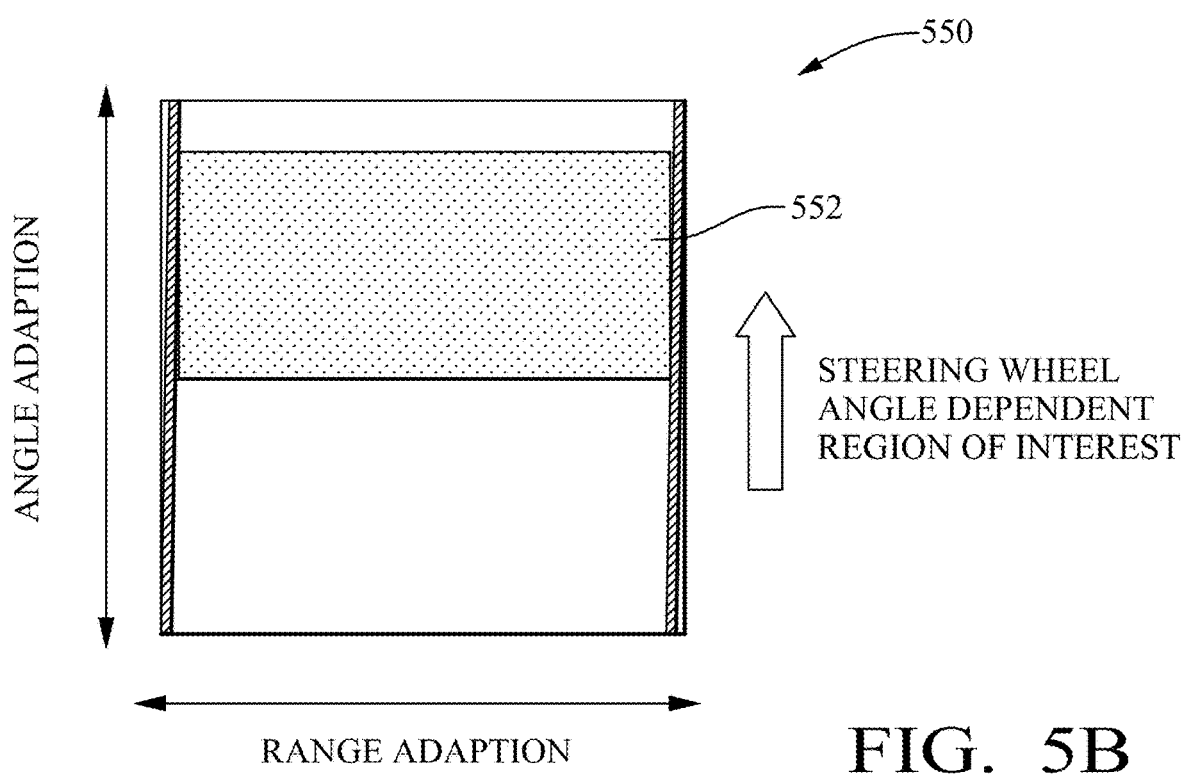

FIG. 5A and FIG. 5B show illustrations 500 and 550 of an adaption of the angular region of interest dependent on the steering wheel angle according to various implementations.

According to the steering wheel angle, it may be possible to calculate the driving path of the ego vehicle. By this, the region of interest may be aimed into the direction of driving.

Thus, the savings for excluded angular area may be maximized. According to regulatory rules the curvature which can be expected not to be exceeded is defined.

Figure 6:
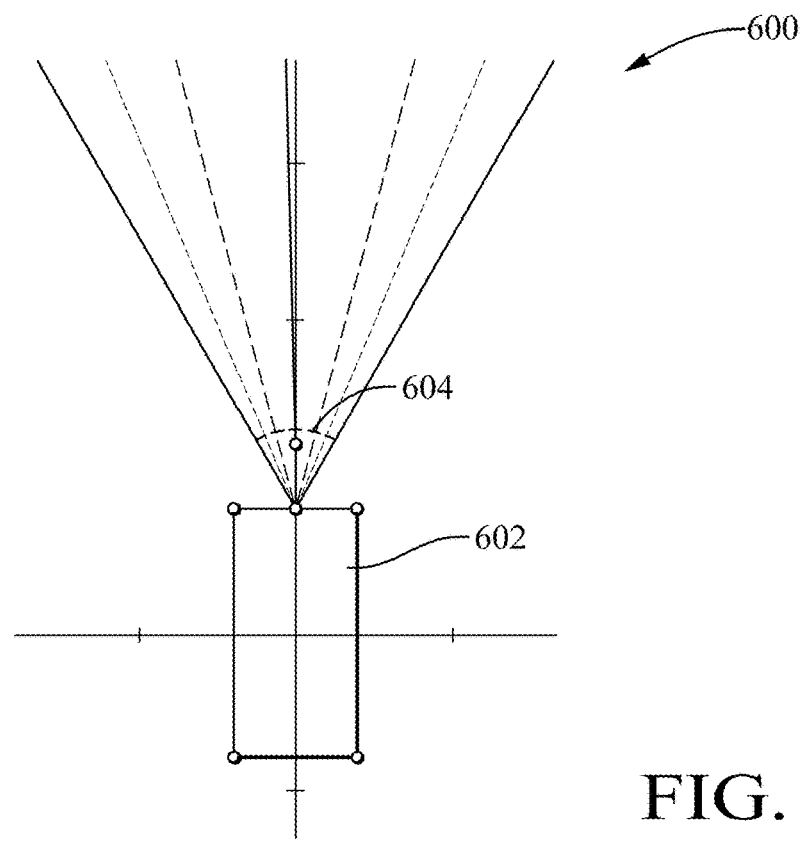
FIG. 6 is an illustration of an example radar sensor on a vehicle.

FIG. 6 shows an illustration 600 of a radar sensor on a vehicle.

Figure 7:
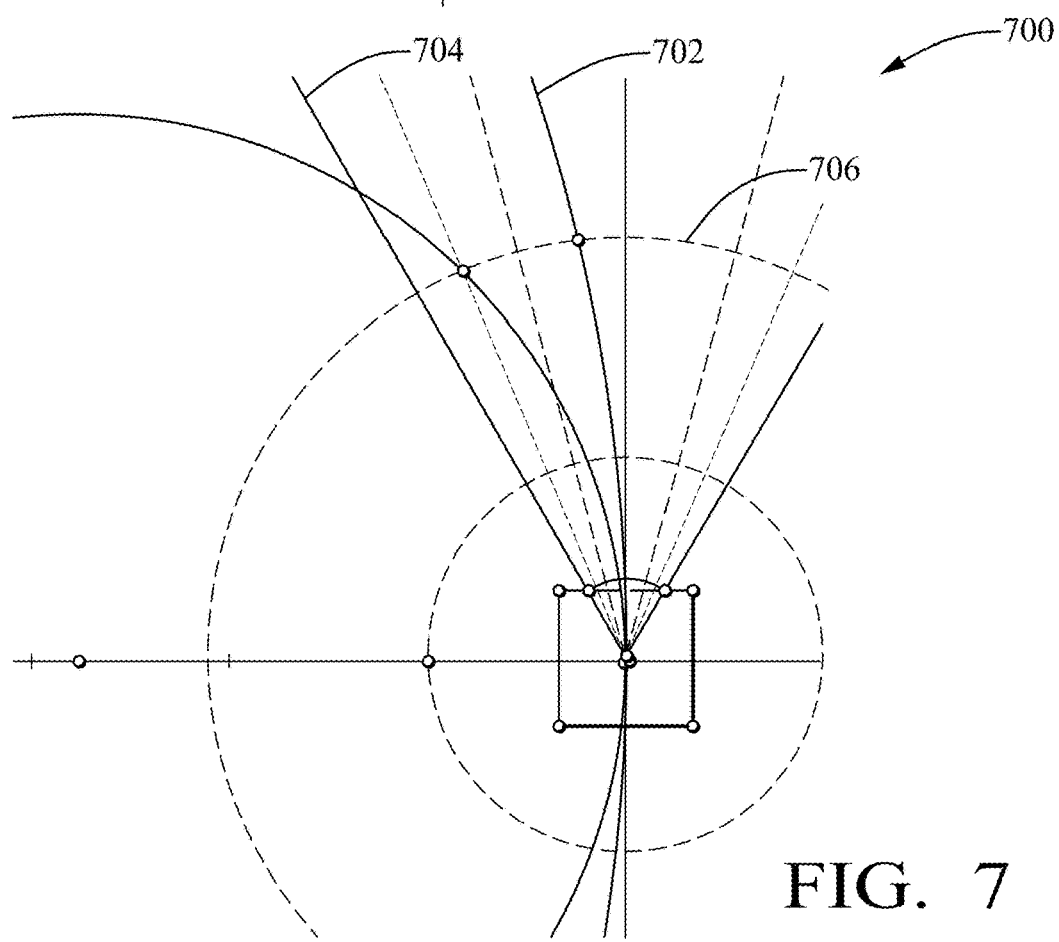
FIG. 7 is an illustration of example maximum curvatures on highways.

FIG. 7 shows an illustration 700 of maximum curvatures on highways.

Figure 8:
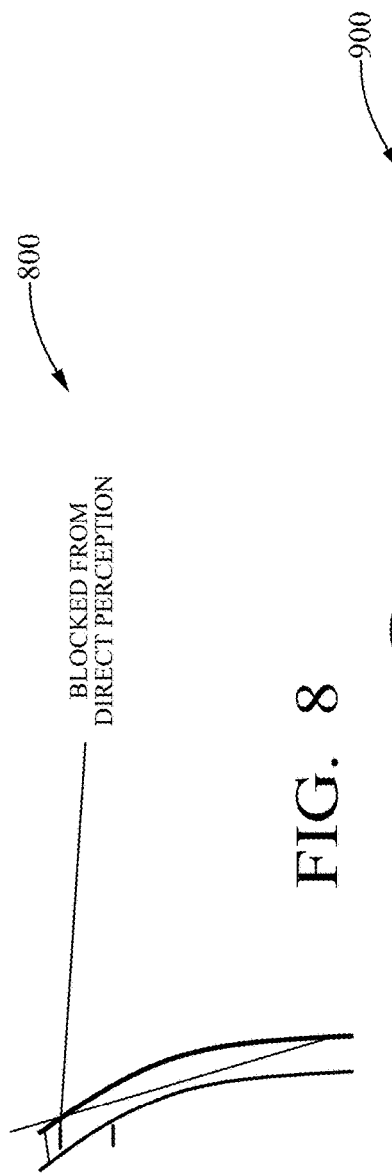
FIG. 8 is an illustration of an example blocked view.

FIG. 8 shows an illustration 800 of a blocked view.

Use cases may include example calculation of road curvature and thereby resulting opening angle. These angles/curvatures and depending on that target speeds may depend on feature requirements and are thereby not explicitly defined.

For example, a feature (e.g., Autonomous Emergency Braking (AEB)) which only considers in lane objects or neighboring lane potential candidates to lane change may have a requirement targeting that area plus a safety area at the sides. A feature depending on bridge recognition may have requirements also considering the road's side areas, where a bridges boundaries might be expected.

Use cases (for example as illustrated in FIG. 6 to FIG. 8) may assure that also in quantitative measures, the methods and systems according to various implementations can lead to a significant reduction of hardware needs.

In order to understand the quantitative impact of that method, a realistic use case is illustrated in FIG. 6 to FIG. 8.

A front radar of a vehicle 602 may be mounted at a central position in the vehicle front and may have an opening angle of 60° and a range of 210 m (outer circle). The inner circle 604 shows an example mid speed limit with a radius of 105 m (inner circle).

FIG. 7 shows the curvature limitation on a typical German inner city highway with 100 kph speed limitation. With dotted lines the example angular limitation for mid and high speed are shown. It may be seen that there is still a distance taking into account a reasonable driving path area. This distance may be objective to optimizations according to requirements and feature demands.

The curvature 702, 704 shows the respective limitation for highway (high speed) in FIG. 7. Besides the limitation in curvature, it may also be seen that a part of the outer circle 706 may be realistically still blocked from direct perception due to near field barriers of the road (as for example illustrated in FIG. 8).

Figure 9:
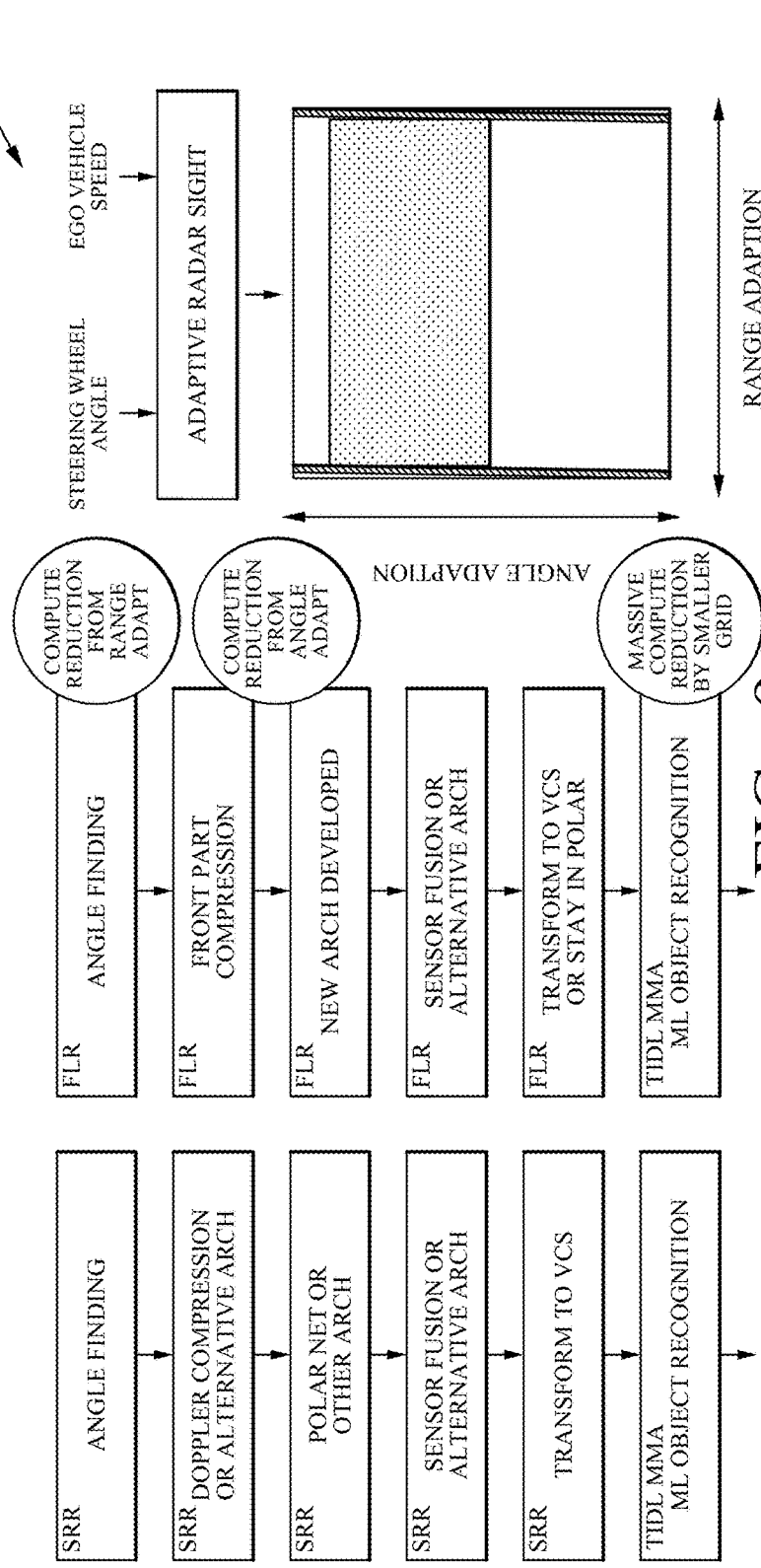
FIG. 9 is an illustration of an example system according to various implementations.

FIG. 9 shows an illustration 900 of a system according to various implementations.

In the following, realization of adaptive computation will be described.

In order to realize the computation steps within the architecture of the radar recognition network, it may be important to base on the given or at least possible architectures and modules influenced by the adaptive region of interest.

FIG. 9 shows a high level overview of the currently existing side radar signal processing on the left and an assumption of how the front radar signal processing will look like in the middle.

Depending on the module impacted by the adaptive radar sight region of interest limitations, the strategy how to realize this may be different. The following may provide details and alternatives; however, it will be understood that other details and alternatives are possible.

Range Dependent Adaptation:
  Filter out the input beam vectors for angle finding according to the range adaptation;
  By this:
  1) strongly limit the number of beam vectors in the low-speed case;
  2) limit less but still impacting computational demand in the mid range; and
  3) do not filter in the long range case.
Angle dependent adaptation:
  in the front part compression step the angle of arrival is known from the module, so the angle adaptation can limit the output of angle finding already earlier, before this module starts to process the input;
  By this:
  1) strongly limit the number of angle dimension of the output tensor in the high-speed case;
  2) limit less but still impacting computational demand in the mid range; and
  3) do not filter in the low speed case.
ML (Machine Learning) Object Recognition:
  the implementation of the detection and classification itself may be based on a grid structure;
  that grid (for near range) may be spatially representing the vehicle coordinate system;
  a possible alternative solution may be to stay in polar coordinate system;
  in all cases the limitation of the angle and range may limit the grid and by this may achieve a massive reduction in computational needs because:
  1) regarding memory this part of the network is a bottle neck:
  2) in order to reach high distance with the front radar sensor the grid area would exceed even the demand seen from the near range area of interest.

As described herein, a realization of three (3) fixed states of driving speed (low, mid and high) may be provided. An alternative may be to have a sliding adaptation of the region of interest, distorting the areas in a continuous manner. The realization of such a variant may imply:
  only a variable filtering limit for both initial steps: range and angle dependent adaptation;
  a constant grid size but distorted input from different ranges/angles.
A further alternative may be to implement a fixed grid:
  A radar needs to balance long range and short range perception. At high speeds, one can expect the perception needs to be focused on high speed roads with limited curvature and curvature changes. Only roads with limited curvatures may truly provide a free field of view over several hundred meters. Due to this fact, a radar processing may process a short range perception over the full field of view, but to limit long range perception >80 m to an area of +−30°-45 degree, which may cut required calculation effort by 25% to 50% for longer ranges while there should be no perceivable performance drop.
  Fixed grid structures may ensure gradient propagation in E2E solutions and may create a trainable system with less need to structure training systematically into motion subclasses or to train the system as two stage approach.

Figure 10:
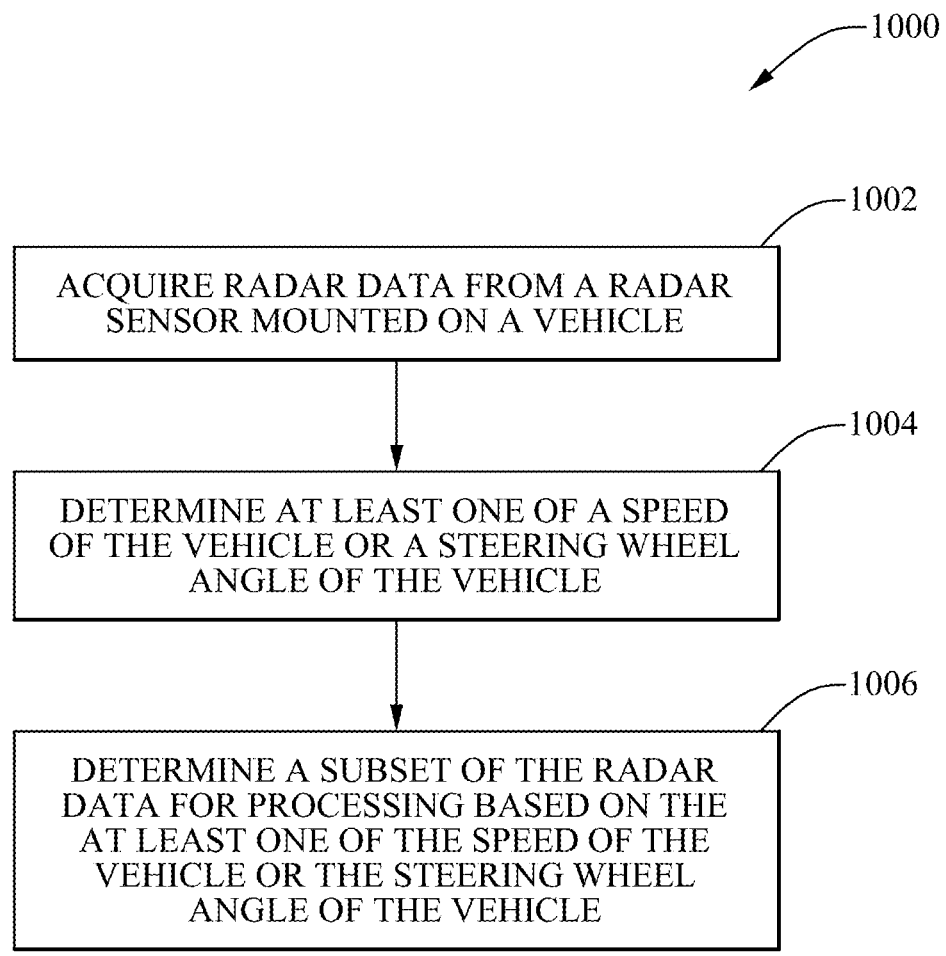
FIG. 10 is a flow diagram illustrating an example method for radar data processing according to various implementations.

FIG. 10 shows a flow diagram 1000 illustrating a method for radar data processing according to various implementations. At 1002, radar data may be acquired from a radar sensor mounted on a vehicle. At 1004, at least one of a speed of the vehicle or a steering wheel angle of the vehicle may be determined. At 1006, a subset of the radar data for processing may be determined based on the at least one of the speed of the vehicle or the steering wheel angle of the vehicle.

According to various aspects, the radar data may include or may be data with a range dimension and an angle dimension; and the subset may include or may be a subset along the range dimension and/or along the angle dimension.

According to various aspects, the range dimension may include or may be a range up to 100 m, or up to 150 m, or up to 200 m, or up to 210 m, or up to 300 m; and/or the angle dimension may include or may be an angle range of 30°, or 45°, or 60°, or 75°, or 90°. It will be understood that these range dimension and angle dimensions are merely examples, and that other values may be used for these dimensions; for example, the range dimension may be a range up to 135 m and the angle dimension may be 35°, or the range dimension may be a range up to 60 m and the angle dimension may be 45°.

According to various aspects, the subset may include or may be a subset along the range dimension based on the speed of the vehicle.

According to various aspects, for a speed below a first speed threshold, the range dimension may be limited to a first range limit.

According to various aspects, the subset may include or may be a subset along the angle dimension based on the speed of the vehicle.

According to various aspects, for a speed below between the first speed threshold and a second speed threshold, the range dimension may be limited to a second range limit and the angle dimension may be limited between a first angle limit and a second angle limit.

According to various aspects, for a speed higher than the second speed threshold, the angle dimension may be limited between a third angle limit and a fourth angle limit.

According to various aspects, the subset may include or may be a subset along the angle dimension based on the steering wheel angle of the vehicle.

According to various aspects, the subset along the range dimension may be determined based on filtering out input beam vectors for angle finding.

According to various aspects, the subset along the angle dimension may be determined based on limiting an output of an angle finding method.

According to various aspects, the speed of the vehicle and/or the steering wheel angle of the vehicle may be determined from a bus system of the vehicle.

Each of the steps 1002, 1004, 1006 and the further steps described above may be performed by computer hardware components.

What is claimed is:

1. A method comprising:
acquiring radar data from a radar sensor mounted on a vehicle;
determining at least one of a speed of the vehicle or a steering wheel angle of the vehicle; and
determining a subset of the radar data for processing based on the at least one of the speed of the vehicle or the steering wheel angle of the vehicle,
wherein the radar data comprises data within a range dimension and an angle dimension;
wherein the subset comprises a subset along the range dimension; and
wherein:
the subset further comprises a subset along the angle dimension;
the subset comprises a subset along the range dimension based on the speed of the vehicle; and
for a speed below a first speed threshold, the range dimension is limited to a first range limit.

2. The method of claim 1, wherein at least one of:
the range dimension comprises a range up to 60 m, 100 m, 135 m, 150 m, 200 m, 210 m, or 300 m; or
the angle dimension comprises an angle range of 30°, 35°, 45°, 60°, 75°, or 90°.

3. The method of claim 1, wherein:
the subset further comprises a subset along the angle dimension based on the speed of the vehicle.

4. The method of claim 3, wherein:
for a speed between the first speed threshold and a second speed threshold, the range dimension is limited to a second range limit, and the angle dimension is limited between a first angle limit and a second angle limit.

5. The method of claim 4, wherein:
for a speed higher than the second speed threshold, the angle dimension is limited between a third angle limit and a fourth angle limit.

6. The method of claim 1, wherein:
the subset further comprises a subset along the angle dimension based on the steering wheel angle of the vehicle.

7. The method of claim 1, wherein the determining the subset comprises:
determining the subset along the range dimension based on filtering out input beam vectors for angle finding.

8. The method of claim 1, wherein the determining the subset comprises:
determining the subset along the angle dimension based on limiting an output of an angle finding method.

9. The method of claim 1, wherein the determining of the at least one of the speed of the vehicle or the steering wheel angle of the vehicle comprises:
determining the at least one of the speed of the vehicle or the steering wheel angle of the vehicle from a bus system of the vehicle.

10. A vehicle comprising:
a computer system comprising a plurality of computer hardware components configured to:
acquire radar data from a radar sensor mounted on the vehicle;
determine at least one of a speed of the vehicle or a steering wheel angle of the vehicle; and
determine a subset of the radar data for processing based on the at least one of the speed of the vehicle or the steering wheel angle of the vehicle,
wherein the radar data comprises data within a range dimension and an angle dimension;
wherein the subset comprises a subset along the range dimension; and
wherein:
the subset further comprises a subset along the angle dimension;
the subset comprises a subset along the range dimension based on the speed of the vehicle; and
for a speed below a first speed threshold, the range dimension is limited to a first range limit.

11. The vehicle of claim 10, further comprising: the radar sensor.

12. The vehicle of claim 10, wherein:
the subset further comprises a subset along the angle dimension based on the speed of the vehicle.

13. The vehicle of claim 10, wherein:
the subset further comprises a subset along the angle dimension based on the steering wheel angle of the vehicle.

14. The vehicle of claim 10, further comprising:
a bus system,
wherein the at least one of the speed of the vehicle or the steering wheel angle of the vehicle is determined from the bus system.

15. At least one non-transitory computer readable medium comprising instructions, which when executed by a processor, cause the processor to perform operations including:
acquiring radar data from a radar sensor mounted on a vehicle;
determining at least one of a speed of the vehicle or a steering wheel angle of the vehicle; and
determining a subset of the radar data for processing based on the at least one of the speed of the vehicle or the steering wheel angle of the vehicle,
wherein the radar data comprises data within a range dimension and an angle dimension;
wherein the subset comprises a subset along the range dimension; and
wherein:
the subset further comprises a subset along the angle dimension;
the subset comprises a subset along the range dimension based on the speed of the vehicle; and
for a speed below a first speed threshold, the range dimension is limited to a first range limit.

* * * * *